United States Patent [19]

Akamatsu

[11] Patent Number: 4,506,319
[45] Date of Patent: Mar. 19, 1985

[54] INDUCTIVELY COMMUTATED THYRISTOR INVERTER

[75] Inventor: Masahiko Akamatsu, Hyogo, Japan

[73] Assignee: Mitsubishi Denki Kabushiki Kaisha, Tokyo, Japan

[21] Appl. No.: 451,653

[22] PCT Filed: Apr. 8, 1982

[86] PCT No.: PCT/JP82/00109
§ 371 Date: Dec. 6, 1982
§ 102(e) Date: Dec. 6, 1982

[30] Foreign Application Priority Data

Apr. 8, 1981 [JP] Japan .................. 56-53975

[51] Int. Cl.³ .............................................. H02M 7/515
[52] U.S. Cl. .................. 363/138; 307/252 M
[58] Field of Search ................. 363/136–138, 363/96, 41; 307/252 M

[56] References Cited

U.S. PATENT DOCUMENTS 3,538,419  11/1970  Seki et al. .................. 363/138

FOREIGN PATENT DOCUMENTS 95149  9/1974  Japan .
32813  9/1976  Japan .
127876 10/1980 Japan .................. 363/138
127887 10/1980 Japan .................. 363/138

OTHER PUBLICATIONS

Bulatov et al., "A Combination Turn-Off Thyristor," Sov. Electr. Eng. (USA), vol. 49, No. 6, pp. 31–36, (1978).

*Primary Examiner*—William H. Beha, Jr.
*Attorney, Agent, or Firm*—Sughrue, Mion, Zinn, Macpeak, and Seas

[57] ABSTRACT

A power converter apparatus has a solid-state switching device 11 for cutting off a current flowing from a DC power supply 1 to a bridge circuit 2 when reverse-biasing thyristors in the bridge circuit 2, and an inductance element 12 and an auxiliary solid-state switching device 13 connected in series between positive and negative DC lines interconnecting the DC power supply 1 and the bridge circuit 2 through the solid-state switching device 11. A magnetic energy is stored in the inductance element 12 during an interval of time in which the solid-state switching device 11 and the auxiliary solid-state switching device 13 are rendered conductive. The magnetic energy is discharged to reverse-bias the thyristors.

5 Claims, 16 Drawing Figures

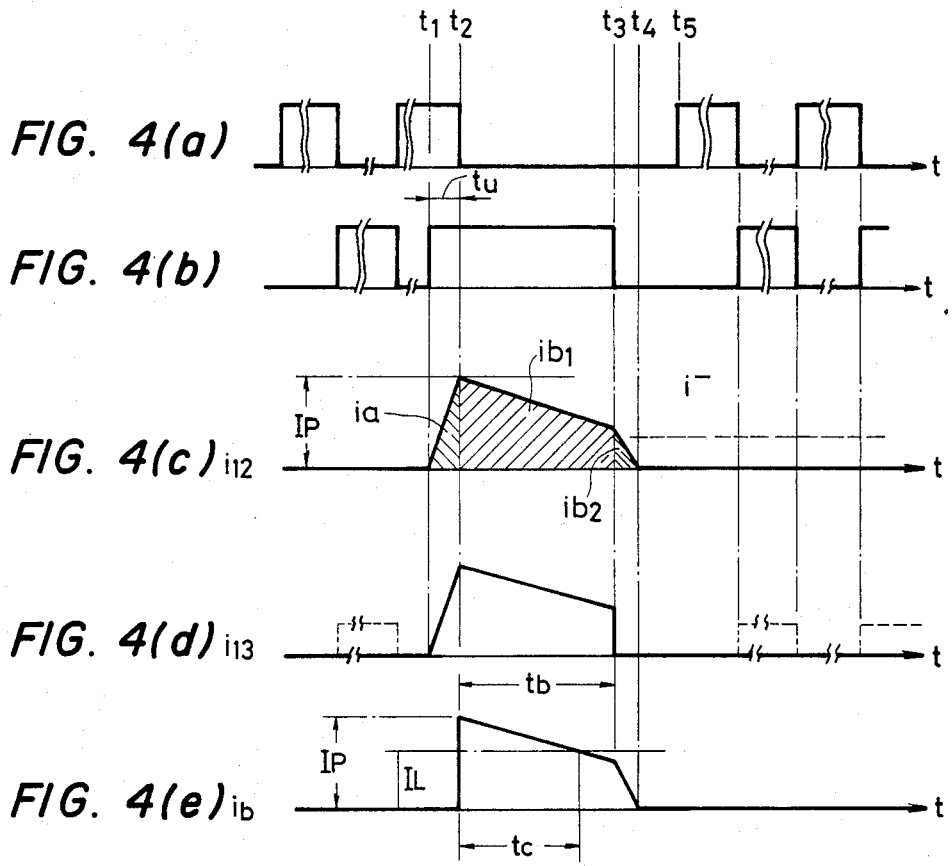

INDUCTIVELY COMMUTATED THYRISTOR INVERTER

TECHNICAL FIELD

The present invention relates to a power converter including an inverter circuit having choppers and a commutation circuit for the inverter circuit, and more particularly to an improvement in the commutation circuit.

BACKGROUND ART

FIG. 1 shows a conventional power converter apparatus of the type described. Designated at 1 is a DC power supply, and 2 a three-phase bridge circuit connected through a chopper thyristor 3 between power supply terminals P, N of the DC power supply 1. The bridge circuit 2 comprises a thyrister bridge circuit comprising thyristors $2_{UP}$, $2_{UN}$, thyristors $2_{VP}$, $2_{VN}$, thyristors $2_{WP}$, $2_{WN}$, and diodes $5_{UP}$–$5_{WN}$ coupled respectively to the thyristors in anti-parallel connection. By controlling the thyristors for conduction in a predetermined order, desired three-phase alternating currents can be generated from output terminals U, V, W. The DC voltage applied across input terminals A, B of the bridge circuit 2 can be controlled by controlling the ratio of conduction time of the chopper thyristor 3.

To the chopper thyristor 3 for the inverter circuit of the foregoing construction is coupled a chopper feedback diode 4 in anti-parallel connection. The inverter feedback diodes $5_{UP}$, $5_{UN}$, $5_{VP}$, $5_{VN}$, $5_{WP}$, $5_{WN}$ are coupled respectively to the thryristors of the inverter circuit 2 in anti-parallel connection. A series-connected circuit composed of a commutation capacitor 6, an inverter commutation reactor 7, and a commutation thyristor 8 energizable when reverse-biasing the thyristors of the bridge circuit 2 is connected in parallel between the input terminals A, B of the bridge circuit 2. Another series-connected circuit composed of a commutation thyristor 9 energizable when reverse-biasing the chopper thyristor 3 and a chopper commutation reactor 10 is connected between the terminal of the chopper feedback diode 4 which is coupled to the DC power supply and the negative terminal as shown of the commutation capacitor 6. The series-connected circuits serve as commutation circuits for the inverter circuit 2 and the chopper thyristor 3.

Commutation operation of the arrangement of FIG. 1 will be described with reference to FIGS. 2(a) and (b) which show the waveforms of a voltage Vc and a current ic for the commutation capacitor 6. The voltage Vc (FIG. 2(a)) charged across the commutation capacitor 6 with the polarity as shown in FIG. 1 is discharged by triggering the thyristor 9 through a closed loop composed of the capacitor 6, the feedback diode 4, the thyristor 9, the reactor 10 and the capacitor 6. Then, the polarity of the voltage Vc (FIG. 2(a)) across the capacitor 6 is reversed. At this time, a pulse current ic+(FIG. 2(b)) of a substantially sinusoidal waveform flows from the capacitor 6 to reverse-bias the chopper thyristor 3, which is extinguished.

Then, by triggering the thyristor 8, the voltage charged across the capacitor 6 in the opposite polarity by the pulse current ic+ is discharged through a closed loop composed of the capacitor 6, the reactor 7, the thyristor 8 and the feedback diodes in the inverter circuit 2, and the capacitor 6. The capacitor 6 is supplied with a negative pulse current ic−(FIG. 2(b)) of a substantially sinusoidal waveform. At this time, the thyristors $2_{UP}$–$2_{WN}$ in the inverter circuit 2 are all extinguished for forced communication.

Assuming that each of the inductances of the reactors 7, 10 is L, and the electrostatic capacitance of the capacitor is C, the pulse current has a crest value Ip and a half period interval tw as follows:

$$Ip = Vc\sqrt{C/L} \tag{1}$$

$$tw = \pi\sqrt{LC} \tag{2}$$

It is desirable that the circuit arrangement be designed for the crest value Ip and the half period time tw to meet the following relationships:

$$\left. \begin{array}{l} Ip = Vc\sqrt{C/L} \approx 2IL \\ tw = \pi\sqrt{LC} \approx 3/2 tc \end{array} \right\} \tag{3}$$

where IL is the crest value of a load current to be commutated, and tc is the reverse-biasing time. Therefore, the electrostatic capacitance C of the commutation capacitor 6 and the inductances L of the commutation reactors 7, 10 are required to have values defined by the following expressions:

$$C \approx \frac{3}{\pi} \frac{(IL \cdot tc)}{Vc} \tag{4}$$

$$L \approx \frac{3}{4\pi} \frac{(Vc \cdot tc)}{IL}$$

In the arrangement of FIG. 1, the commutation capacitor and the commutation reactors in the power converter apparatus greatly affect the dimension and cost of the apparatus as compared with the other semiconductor devices, a condition which constitutes a bottleneck in fabricating power converter apparatus of thyristor inverters. For the above reason, therefore, transistor inverters are more relied upon for power converter apparatus having a smaller capacity of several kW or less.

It is an object of the present invention to provide a commutation circuit which is simpler than the foregoing conventional arrangement.

DISCLOSURE OF THE INVENTION

According to the present invention, a commutation magnetic energy is supplied from a DC power supply and stored into an inductance element through a solid-state switching device and an auxiliary switching device, and an inverter circuit is reverse-biased by the stored energy. With this arrangment, a commutation means is of a simple structure.

BRIEF DESCRIPTION OF THE DRAWINGS

FIGS. 4(a)–4(e) are diagrams showing the waveforms illustrative of operations of various parts of the power converter apparatus of FIG. 3;

BEST MODE FOR CARRYING OUT THE INVENTION

The present invention will now be described in more detail with reference to the accompanying drawings.

Figure 1:
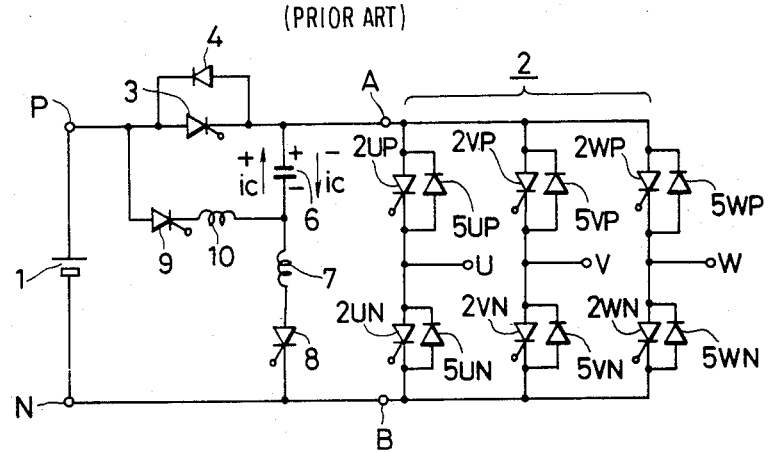
FIG. 1 is a diagram of a conventional power converter apparatus.
Figure 2A:
FIGS. 2(a) and 2(b) are diagrams showing the waveforms of a voltage and a current in the power converter apparatus of FIG. 1 while in operation.
Figure 2B:
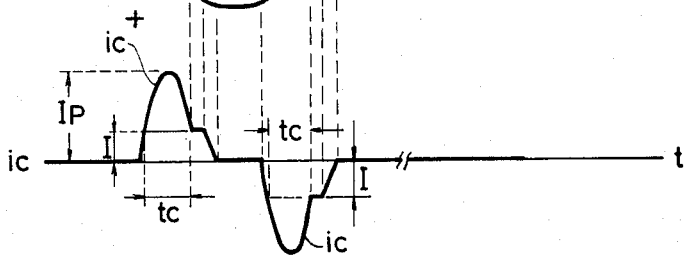
Figure 3:
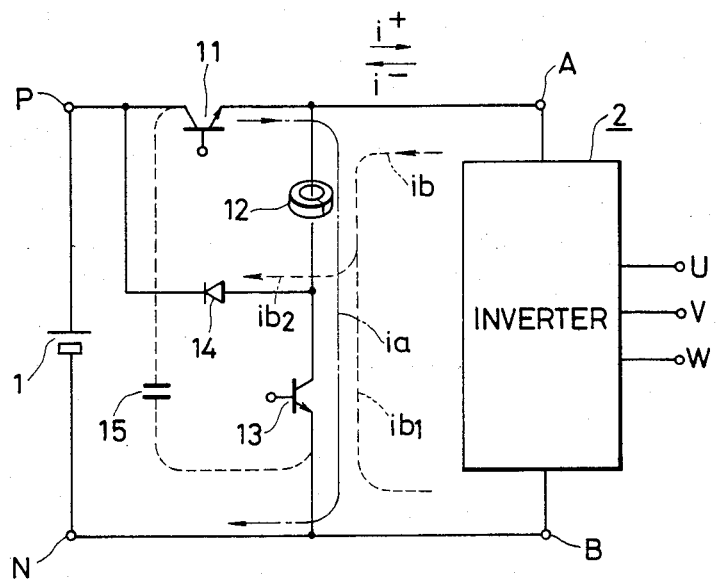
FIG. 3 is a diagram of a power converter apparatus according to an embodiment of the present invention.

An embodiment of the present invention will be described with reference to FIG. 3 in which corresponding parts are denoted by identical reference characters in FIG. 1. In FIG. 3, a solid-state switching device 11 (which comprises a transistor for example) is connected in a DC line connecting the positive terminal of the DC power supply 1 to the bridge circuit 2. The solid-state switching device 11 can be turned off by a control electrode thereof. A series-connected circuit composed of an inductance element 12 such as a coil, a conductor extending through a magnetic core, a coil with a magnetic core, or a wiring inductor, and an auxiliary switching device 13 such as a transistor, a gate turn-off thyristor, a field-effect transistor, or a thyristor with a field effect, is connected between DC lines connected to the positive and negative terminals of the power supply. The auxiliary switching device 13 should preferably have a self turn-off characteristic such that it can be turned off by a control electrode thereof. A reverse-conducting element 14 is connected between the terminal of the solid-state switching device 11 which is connected to the DC power supply 1 and one terminal of the inductance element 12 for passing a reverse current through the solid-state switching device 11. The solid-state switching device 11 should preferably have a turn-off time shorter than that of the auxiliary switching device 13.

Commutation operation of the circuit arrangement shown in FIG. 3 will be described with reference to the timing chart of FIG. 4 on the assumption that PWM control (described later) is effected by the solid-state switching device 11 and the auxiliary switching device 13. The solid-state switching device 11 is controlled for conduction as shown at (a) in FIG. 4, and the auxiliary solid-state switching device 13 is controlled for conduction as shown at (b) in FIG. 4. An interval of time $t_1$–$t_4$ is related to commutation, and the switching devices 11, 13 are caused to conduct at the same time during an interval of time $t_u$ between times t1 and t2. The above conduction control causes currents as shown at (c) and (d) in FIG. 4 to flow respectively through the inductance element 12 and the auxiliary switching device 13. During the time interval $t_u$, a current $i_{12}$ flowing through the inductance element 12 is increased through a closed loop composed of the power supply 1, the solid-state switching device 11, the inductance element 12 and the auxiliary switching device 13 so that a commutation magnetic energy will be stored in the inductance 13. To supply such a current, a capacitor 15 may be connected as shown by the dotted lines in FIG. 3.

The crest value Ip of the commutation reactor current $i_{12}$ which increases during the time interval tu can be given by:

$$Ip = (E/Lo)t_u \quad (5)$$

where E is the power supply voltage and Lo is the inductance.

When the solid-state switching device 11 is turned off, the stored energy in the inductance element 12 is discharged, and the commutation reactor current $i_{12}$ is indicated by $i_{b1}$ in FIG. 4(c). Thus, the commutation reactor current continues to flow through the inductance element 12, the auxiliary solid-state switching device 13, and the bridge circuit 2. As a result, a reverse-biasing current $i_b$ (FIG. 4(e)) flows in the opposite direction between the DC input terminals A, B through the bridge circuit 2, whereupon all of the thyristors in the bridge circuit 2 are reverse-biased. The rate of speed $di_b/dt$ at which the current decreases at this time is expressed by:

$$\frac{di_b}{dt} = \frac{Vb}{Lo} \quad (6)$$

where Vb is the sum of the voltage drops across the auxiliary switching device 13 and the bridge circuit 2. Let the load current to be commutated be IL, and the reverse-biasing time tc can be expressed by:

$$tc = (Ip - IL)/(di_b/dt)$$
$$= \frac{(Ip - IL)LO}{Vb}$$

by putting the equation (5) into the equation (6), $$tc = \frac{(Etu - LoIL)}{Vb} \quad (7)$$

Assuming that the circuit is designed with the relationship Ip=2IL, the inductance Lo required of the inductance element 12 and the time interval $t_u$ needed are expressed as follows:

$$Lo = \frac{(Vb)}{IL} tc \quad (8)$$

$$t_u = \frac{2Vbtc}{E}$$

When the auxiliary switching device 13 is turned off (FIG. 4(d)) at a time t3 after a period of time tb in which the bridge circuit 2 is reverse-biased, a remaining portion $i_{b2}$ (FIG. 4(c)) of the commutation reactor current $i_{12}$ flows through the bridge circuit 2, the inductance element 12, and the reverse-conducting element 14. As a consequence, the remaining energy stored in the inductance element 12 is collected by the power supply 1.

With the foregoing embodiment of the present invention, the voltage Vb in the equation (8) is selected to be Vb≈3–5 V while the voltage Vc in the equation (4) for the prior circuit arrangement is Vc≧E, as is understood from comparison between the equations (4), (8), and hence the inductance Lo in the equation (8) can be of quite a small value. Thus, air-core inductance coil, a wiring inductance coil, or an inductance coil with a through magnetic core may be used. The auxiliary switching device 13 may be utilized for shortcircuiting the input terminals of the bridge circuit 2 as well as for the commutation purpose.

Figure 5A:
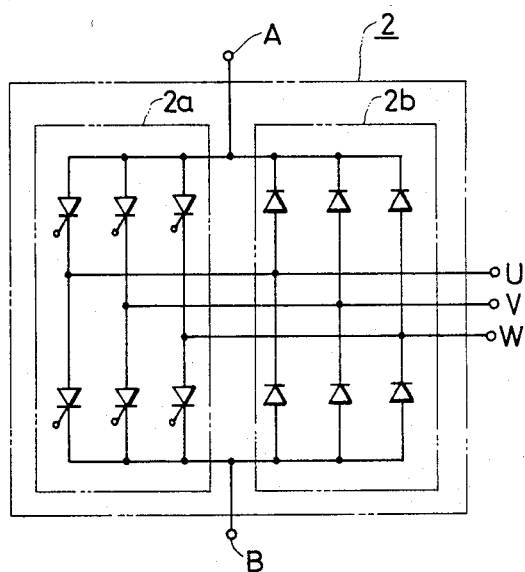
FIGS. 5(a)–5(c) are circuit diagrams of inverter circuits applicable to the power converter apparatus of FIG. 3.
Figure 5C:
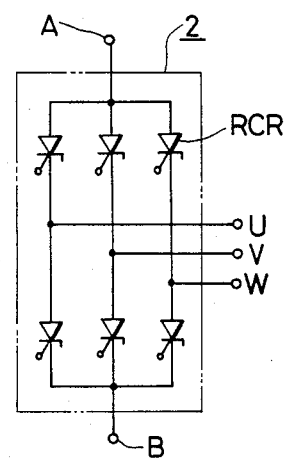
Figure 5B:
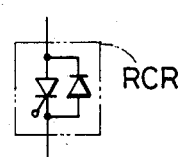
Figure 6A:
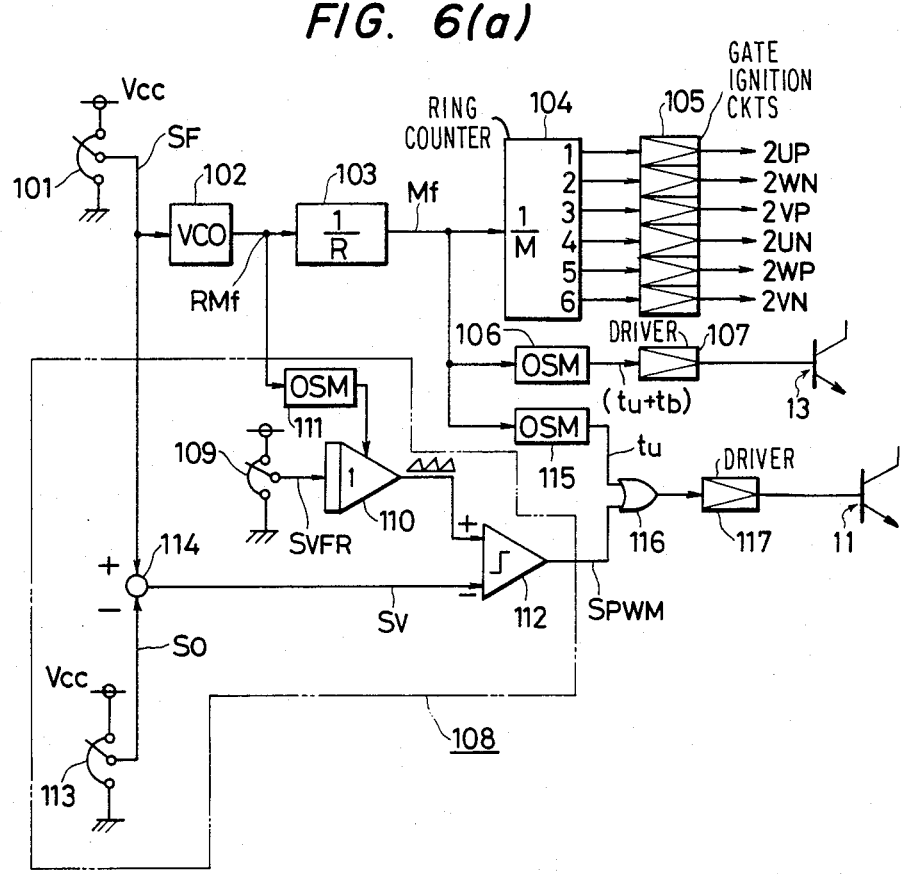
FIGS. 6(a) and 6(b) are a diagram of an inverter circuit applicable to the power converter apparatus of FIG. 3 and a diagram showing the waveforms of operations of various parts of the power converter apparatus of FIG. 3.
Figure 6B:
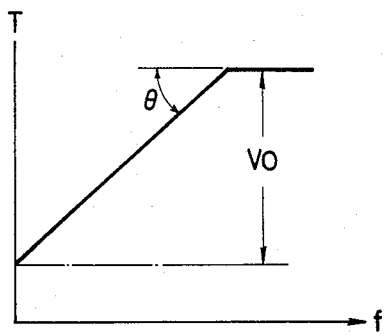

The bridge circuit 2 shown in FIG. 3 may be composed, as shown in FIG. 5(a), of a known arrangement including a thyristor circuit 2a and a diode circuit 2b connected in parallel reverse relation thereto between the input and output terminals A, B. Alternatively, a bridge circuit as shown in FIG. 5(c) may be employed which has reverse-conducting thyristors RCR each of which is functionally equivalent to a thyristor and a diode connected in parallel reverse relation thereto, as illustrated in FIG. 5(b). For pulse width modification (PWM) with the arrangement shown in FIG. 3, the solid-state switching device 11 and the auxiliary switching device 13 are turned on and off to supply the inverter circuit 2 with a current i+ having a polarity as shown to control the supplied voltage and current on pulse width modulation (PWM). When the solid-state switching device 11 is turned off, the AC terminals U, V, W are shortcircuited through the thyristors and diodes in the bridge circuit 2, that is, the output voltage falls to zero. When at least the auxiliary switching device 13 is turned off while a current i− is flowing back in the illustrated direction from the bridge circuit 2 to the power supply 1, the current i− flows through the reverse-conducting element 14 to the power supply 1, whereupon the output voltage is equal to the power supply voltage. When the solid-state switching device 11 is turned off and the auxiliary solid-state switching device 13 is turned on while the same current i− is flowing, the input terminals A, B and hence the AC output terminals are shortcircuited through the auxiliary solid-state switching device 13. Accordingly, the voltages across the DC input terminals A, B and the AC output terminals, respectively, become equal to the power supply voltage or zero dependent on turn-on or turn-off of the solid-state switching device 11 and the auxiliary switching device 13 regardless of the polarity of the current flowing through the DC line connected to the input terminal of the bridge circuit 2. Therefore, the voltage supplied to the inverter circuit 2 is controlled by PWM (pulse width modulation) according to the ratio of the time interval in which the solid-state switching device 11 is turned on to the time interval in which the auxiliary switching device 13 is turned on. FIG. 6 is a diagram illustrative of a PWM control circuit applicable to the apparatus according to the present invention. Designated in FIG. 6(a) at 101 is a frequency-setting variable resistor, 102 a voltage-controlled oscillator (voltage frequency converter), 103 a frequency divider having a frequency dividing ratio of R, 104 a ring counter for frequency-dividing and distributing the input into M outputs, 105 a group of gate ignition means for igniting the thyristors in the bridge circuit 2, 106 a one-shot multivibrator supplied with a frequency signal Mf (having a frequency which is the product of the number M of the elements in the bridge circuit 2 and an output frequency f) in each commutation operation for producing an output pulse signal during a period $(t_u+t_b)$ from the time t1 to the time t3 in FIG. 4, 107 a driver for driving the control electrode of the auxiliary solid-state switching device 13, and 108 a pulse-width-modulation circuit. The pulse-width-modulation circuit has a sawtooth generator composed of a variable resistor 109 for generating a signal $S_{VFR}$ to be integrated, an integrator 110 with a reset function for receving the signal $S_{VFR}$ to be integrated, and a one-shot multivibrator 111, and a comparator 112. The comparator 112 is supplied with a combined output $S'_V$ which is the sum of a frequency command signal $S_F$ from the frequency command variable resistor 101 and an output signal $S_O$ from a variable resistor 113 which output signal serves to adjust the extent $V_O$ by which the output voltage varies due to PWM control. For coaction with the frequency command signal $S_F$ to control the output pulses and hence the output voltage V of the inverter, the comparator 112 is supplied with the combined output signal $S'_V$ from an adder 114 and an output from the integrator 110 for generating an output signal $S_{PWM}$. There is also provided a one-shot multivibrator 115 supplied with the frequency signal Mf from the frequency divider 103 for producing a signal corresponding to the time interval $t_u$. The output tu from the one-shot multivibrator 115 and the output $S_{PWM}$ from the comparator 112 are added together into a control signal for the driver 117 for driving the control electrode of the solid-state switching device 11. The output voltage V and the output frequency f in the arrangement shown in FIG. 6(a) have a relationship as illustrated in FIG. 6(b). The signals $S_F$, $S'_V$, $S_O$, $S_{VFR}$, the output voltage V and the frequency f have the following relationships:

$$\left. \begin{array}{l} f \propto S_F \\ V \propto (1 - S'_V) \\ V_O \propto S_O \\ \tan\theta \propto S_{VFR} \end{array} \right\} \quad (9)$$

Figure 7:
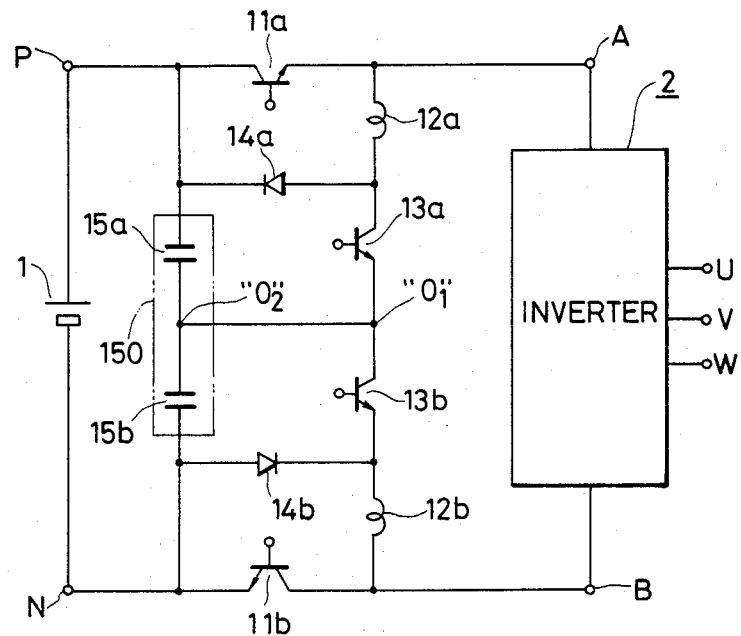
FIGS. 7 and 8 are diagrams illustrative of other embodiments of the present invention.

FIG. 7 shows another embodiment of the present invention suitable for converting an electric power at a high voltage. As shown, separate solid-state switching devices 11a, 11b are placed respectively in positive and negative lines connected between power supply terminals P, N of a DC power supply 1 and input and output terminals A, B of an inverter circuit 2. Separate inductance elements and auxiliary switching devices are also connected between the positive and negative DC lines. More specifically, an inductance element 12a, an auxiliary solid-state switching device 13a, and a reverse-conducting element 14a are provided with respect to the solid-state switching device 11a on the side of the positive terminal of the DC power supply 1. An inductance element 12b, an auxiliary solid-state switching device 13b, and a reverse-conducting element 14b are provided with respect to the solid-state switching device 11b on the side of the negative terminal of the DC power supply 1. The foregoing components jointly define a commutation circuit which is symmetrical on its positive and negative sides. A voltage divider 150 is composed of series-connected partial power supplies or series-connected capacitors 15a, 15b for dividing the voltage from the DC power supply 1, the voltage divider 150 having an intermediate potential point $O_2$ coupled to an intermediate potential point $O_1$ between the commutation circuits.

With the arrangement of FIG. 7, since the solid-state switching devices 11a, 11b and the auxiliary switching devices 13a, 13b serve to bear the halves of the voltage, the bridge circuit 2 which is composed of elements capable of withstanding high voltages may be combined with the self turn-off switching devices 11a, 11b, 13a, 13b incapable of withstanding high voltages to provide a power converter apparatus of an increased capacity capable of withstanding high voltages.

Figure 8:
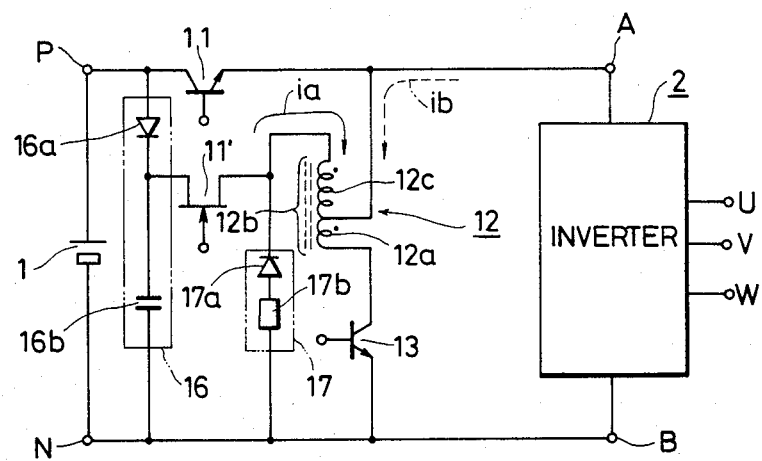

According to still another embodiment shown in FIG. 8, an inductance element 12 comprises a reactor winding provided by an intermediate tap with a main winding 12a and an auxiliary winding 12b, there being added a wind-up portion 12c wound by a single winding process. The main winding 12a has a larger number of turns than that of the auxiliary winding 12b. The main winding 12a and the auxiliary switching device 13 are connected in series between the input terminals A, B of the inverter circuit 2. The auxiliary winding 12b has a wind-up end (other end) connected to a pulse current supply circuit 16 through a storage control high-speed solid-state switch 11'. The pulse current supply circuit 16 is connected parallel to the DC power supply 1 and comprises a diode 16a and a capacitor 16b. The high-speed solid-state switching device 11' may comprise a field-effect transistor, for example, which has a shorter turn-off time than that of the auxiliary switching device 13. A clamper 17 for the potential at a terminal of the high-speed solid-state switch 11' is composed of a diode 17a and a resistor 17b connected in series therewith.

When the high-speed solid-state switch 11' is rendered conductive in the time interval tu within the period of time in which the auxiliary switching device 13 is in conduction, a current $i_a$ flows from the pulse current supply circuit 16 to the high-speed solid-state switch 11' to the inductance element 12b and to the auxiliary switching device 13 to store a magnetic energy in the reactor 12. Since the number of turns is greater for the auxiliary winding 12b than for the main winding 12a, the current $i_a$ flowing at this time is reduced. When the high-speed switch 11' is then turned off, the magnetic energy is discharged through the auxiliary switching device 13, the inverter circuit 2 and the main winding 12a to reverse-bias the inverter circuit 2. A current $i_b$ flowing upon discharge of the magnetic energy is greater than the current $i_a$ flowing upon storage of the magnetic energy since the number of turns of the main winding 2a that conducts at this time is larger than that of the auxiliary winding. Thus, $i_b > i_a$. Accordingly, the greater the number of turns of the auxiliary winding 12b than that of the main winding 12a, the smaller the current capacity of the solid-state switch 11' can be, resulting in an element having a high turn-off speed.

INDUSTRIAL APPLICABILITY

A power converter apparatus according to the present invention is useful as a VVVF inverter designed for wide use and its power module.

I claim:

1. A power converter apparatus comprising; a bridge circuit including a thyristor bridge having thyristors, and feedback diodes connected in inverse parallel relationship to said thyristors for conducting current in reverse direction to that of said thyristors; a solid-state switching device inserted in series in at least one of positive and negative lines interconnecting a DC power supply and DC input terminals of said bridge circuit for cutting off a current flowing from aid DC power supply to said bridge circuit when reverse-biasing said thyristors in said bridge circuit, a series-connected circuit of an inductance element and an auxiliary switching device connected between said positive and negative DC lines through said solid-state switching device, a reverse-conducting element for passing a current in reverse direction to that of said solid-state switching device, and control means for creating an interval of time in which the solid-state switching device and the auxiliary solid-state switching device are rendered conductive simultaneously, the arrangement being that a magnetic energy will be stored in said inductance element during said interval of time, and the magnetic energy will be discharged to reverse-bias the thyristors.

2. A power converter apparatus according to claim 1, wherein said solid-state switchig device, said reverse-conducting element, said inductance element, and said auxiliary switching device are provided for each of said positive and negative DC lines in symmetrical relation.

3. A power converter apparatus according to any one of claims 1 and 2, wherein said solid-state switching device comprises a self turn-off switching device capable of being turned off by a control electrode thereof.

4. A power converter apparatus according to claim 3, wherein said solid-state switching device has a turn-off time shorter than that of said auxiliary switching device.

5. A power converter apparatus according to any one of claims 1 and 2, wherein said solid-state switching device has a turn-off time shorter than that of said auxiliary switching device.

* * * * *